United States Patent
Hasegawa et al.

(10) Patent No.: US 8,740,371 B2
(45) Date of Patent: Jun. 3, 2014

(54) INKJET RECORDING INK SET, INK CARTRIDGE, AND INKJET RECORDING APPARATUS

(75) Inventors: Shin Hasegawa, Shizuoka (JP); Minoru Hakiri, Shizuoka (JP); Mitsuru Naruse, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 45 days.

(21) Appl. No.: 13/321,274

(22) PCT Filed: May 28, 2010

(86) PCT No.: PCT/JP2010/059491
§ 371 (c)(1), (2), (4) Date: Nov. 18, 2011

(87) PCT Pub. No.: WO2010/137745
PCT Pub. Date: Dec. 2, 2010

(65) Prior Publication Data
US 2012/0062646 A1 Mar. 15, 2012

(30) Foreign Application Priority Data
May 29, 2009 (JP) .................................. 2009-131246

(51) Int. Cl.
*G01D 11/00* (2006.01)
(52) U.S. Cl.
USPC ........................................................ 347/100
(58) Field of Classification Search
USPC .................. 347/20, 44, 86, 95, 100
See application file for complete search history.

(56) References Cited

U.S. PATENT DOCUMENTS

| | | | | |
|---|---|---|---|---|
| 4,849,773 A | * | 7/1989 | Owatari | 347/100 |
| 6,238,047 B1 | * | 5/2001 | Suzuki et al. | 347/105 |
| 6,786,959 B2 | | 9/2004 | Hakiri et al. | |
| 7,101,919 B2 | * | 9/2006 | Hasegawa et al. | 523/160 |
| 7,172,275 B2 | * | 2/2007 | Hiraoka et al. | 347/100 |
| 7,798,629 B2 | | 9/2010 | Hakiri et al. | |
| 7,815,301 B2 | | 10/2010 | Hasegawa et al. | |
| 2002/0019458 A1 | * | 2/2002 | Hirasa et al. | 523/160 |

(Continued)

FOREIGN PATENT DOCUMENTS

| | | |
|---|---|---|
| JP | 2000 001639 | 1/2000 |
| JP | 2001 348518 | 12/2001 |

(Continued)

OTHER PUBLICATIONS

International Search Report Issued Jul. 6, 2010 in PCT/JP10/059491 Filed May 28, 2010.

(Continued)

*Primary Examiner* — Alessandro Amari
*Assistant Examiner* — Michael Konczal
(74) *Attorney, Agent, or Firm* — Oblon, Spivak, McClelland, Maier & Neustadt, L.L.P.

(57) ABSTRACT

An inkjet recording ink set containing at least a black pigment ink and a color pigment ink which has a color selected from one or more colors, wherein the black pigment ink contains a first anionic self-emulsifying ether polyurethane resin having an acid value of 65 mgKOH/g to 85 mgKOH/g, and the at least one color pigment ink of every color contains a second anionic self-emulsifying ether polyurethane resin having an acid value 10 mgKOH/g to 40 mgKOH/g lower than those of the first anionic self-emulsifying ether polyurethane resin contained in the black pigment ink.

11 Claims, 1 Drawing Sheet

(56) References Cited

U.S. PATENT DOCUMENTS

| | | |
|---|---|---|
| 2003/0166742 A1 | 9/2003 | Hirasa et al. |
| 2004/0259978 A1 | 12/2004 | Tani et al. |
| 2006/0100306 A1 | 5/2006 | Yau et al. |
| 2006/0100307 A1 | 5/2006 | Uerz et al. |
| 2006/0100308 A1 | 5/2006 | Yau et al. |
| 2006/0272543 A1 | 12/2006 | Hakiri et al. |
| 2008/0036830 A1* | 2/2008 | Natori et al. ............ 347/86 |
| 2008/0207805 A1 | 8/2008 | Blease et al. |
| 2008/0207811 A1 | 8/2008 | Brust et al. |
| 2008/0207820 A1 | 8/2008 | Brust et al. |

FOREIGN PATENT DOCUMENTS

| | | | |
|---|---|---|---|
| JP | 2001-348518 | * 12/2001 | ............ B41J 2/01 |
| JP | 2002 079740 | 3/2002 | |
| JP | 2002 167536 | 6/2002 | |
| JP | 2003 313471 | 11/2003 | |
| JP | 2005 008725 | 1/2005 | |
| JP | 2005 290044 | 10/2005 | |
| JP | 2006 044054 | 2/2006 | |
| JP | 2008 069355 | 3/2008 | |
| JP | 2009 001741 | 1/2009 | |
| JP | 2009 067858 | 4/2009 | |
| JP | 2009 067907 | 4/2009 | |
| JP | 4302940 | 5/2009 | |
| JP | 2009 235233 | 10/2009 | |

OTHER PUBLICATIONS

Extended European Search Report in corresponding application 10780696.0 dated Jan. 20, 2014.

* cited by examiner

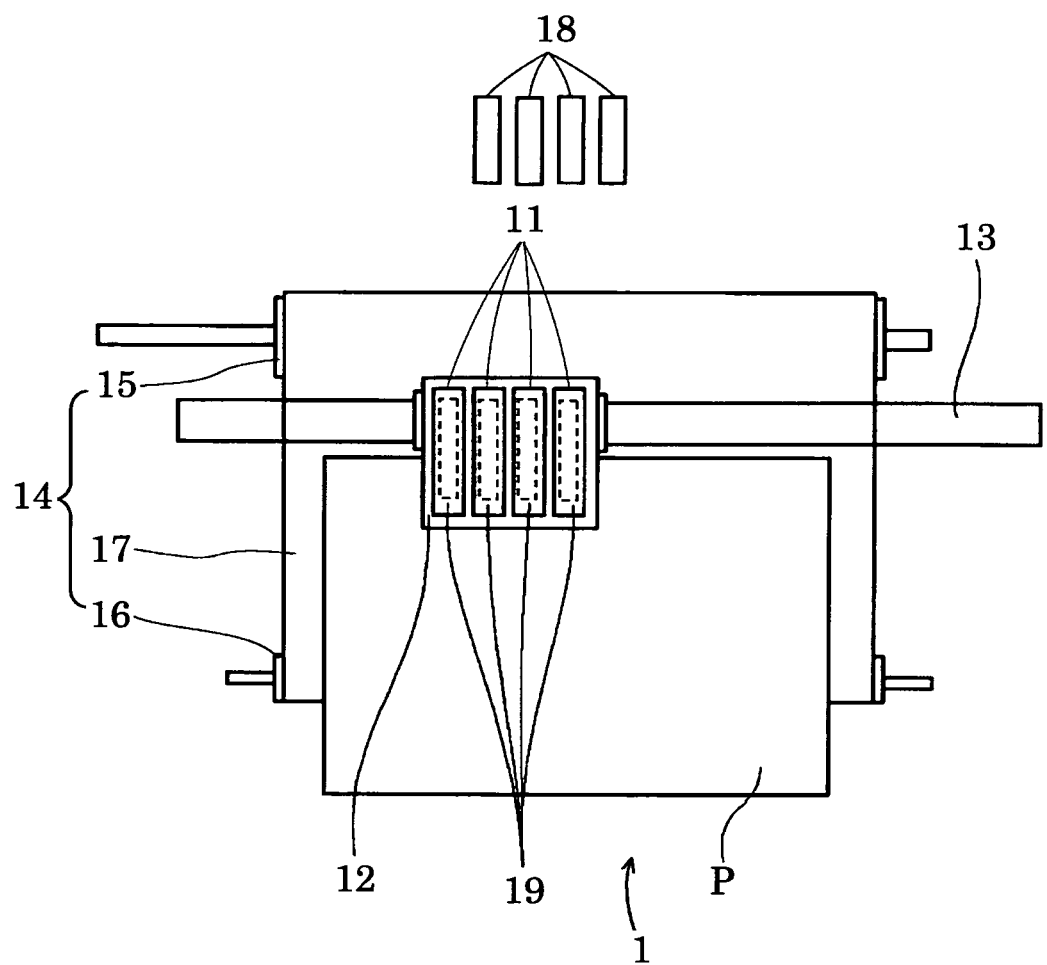

INKJET RECORDING INK SET, INK CARTRIDGE, AND INKJET RECORDING APPARATUS

TECHNICAL FIELD

The present invention relates to an inkjet recording ink set, an ink cartridge containing the ink set, and, an inkjet recording apparatus capable of recording an image using the ink set.

BACKGROUND ART

Until now, there have been various pigment inks proposed for use in inkjet recording, including a color pigment ink used in an ink set according to the present invention. The color pigment ink is disclosed in PTL 1, which concerns a prior application of the present applicant (such as a color pigment ink disclosed in Example 1 of the PLT 1).

According to these inventions of the prior application, image density, ejection stability, storage stability, and the like, can be improved for an inkjet recording process in which a black pigment ink and a color pigment ink are used separately. However, a problem of color-spreading may not be allowed for and solved for the inventions of the prior application in which the black pigment ink and the color pigment ink are ejected simultaneously.

CITATION LIST

Patent Literature

PTL 1: Japanese Patent Application Laid-Open (JP-A) No. 2009-1741

SUMMARY OF INVENTION

Technical Problem

An object of the present invention is to provide an inkjet recording ink set which contains a black pigment ink and a color pigment ink having a color selected from one or more colors, satisfies requirements of good storage stability, ejection stability, and image density, and, which may also prevent color-spreading. It is also an object of the present invention to provide an ink cartridge containing the ink set, as well as an inkjet recording apparatus capable of recording an image using the ink set.

Solution to Problem

The above problems are solved by the following inventions 1) to 4):

<1> An inkjet recording ink set including at least a black pigment ink, and a color pigment ink selected from one or more colors, wherein the black pigment ink contains a first anionic self-emulsifying ether polyurethane resin having an acid value of 65 mgKOH/g to 85 mgKOH/g, and the at least one color pigment ink of every color contains a second anionic self-emulsifying ether polyurethane resin having an acid value 10 mgKOH/g to 40 mgKOH/g lower than that of the first anionic self-emulsifying ether polyurethane resin contained in the black pigment ink.

<2> The inkjet recording ink set according to <1>, wherein the black pigment ink contains a sodium naphthalene sulfonate formaldehyde condensate, and the at least one color pigment ink of every color contains a compound represented by the following General Formula (1):

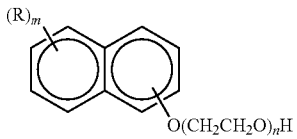

General Formula (1)

wherein R represents one of an alkyl group having 1 to 20 carbon atoms, an aryl group, and an aralkyl group; m represents an integer from 0 to 7; and n represents an integer from 20 to 100.

<3> An ink cartridge, wherein the ink cartridge contains a pigment ink of the inkjet recording ink set according to one of <1> and <2>.

<4> An inkjet recording apparatus, wherein the inkjet recording apparatus is equipped with a head configured to record an image onto a medium by ejecting a pigment ink of the inkjet recording ink set according to one of <1> and <2>.

Advantageous Effects of Invention

The present invention may provide an inkjet recording ink set which contains a black pigment ink and a color pigment ink having a color selected from one or more colors, satisfies requirements of good storage stability, ejection stability, and image density, and, which may also prevent color-spreading. The present invention may also provide an ink cartridge containing the ink set, as well as an inkjet recording apparatus capable of recording an image using the ink set.

BRIEF DESCRIPTION OF DRAWINGS

FIG. 1 shows an embodiment of an inkjet recording apparatus of the present invention.

DESCRIPTION OF EMBODIMENTS

Hereinafter, the present invention will be described in detail.

(Inkjet Recording Ink Set)

An inkjet recording ink set according to the present invention includes at least a black pigment ink and a color pigment ink having a color selected from one or more of colors. The present invention may also include a dispersing agent, and, additional components as required.

<Black Pigment Ink and Color Pigment Ink>

The black pigment ink and the color pigment ink each contain a polyurethane resin. The inks also contain dispersing agent, dispersing solvent, and additional components, as required. Specifically, in the present invention, the acid value of an anionic self-emulsifying ether polyurethane resin (hereinafter, the anionic self-emulsifying ether polyurethane resin may be referred to as polyurethane resin A) contained in the black pigment ink is different from those of anionic self-emulsifying ether polyurethane resins contained in the color pigment ink having a color selected from one or more colors. The anionic self-emulsifying ether polyurethane resin is described, for example, in JP-A No. 2009-67907, JP-A No. 2009-173805, and JP-A No. 2009-161726. It is necessary to set the acid value of the polyurethane resin A contained in the black pigment ink to within the range of 65 mgKOH/g to 85 mgKOH/g. When the acid value of the polyurethane resin A is outside of this range, the problem of color-spreading cannot be solved (see Comparative Examples 1 and 2 mentioned herein below). Furthermore, it is necessary to reduce the acid value of polyurethane resin A contained in the at least one color pigment ink of every color to an acid value 10 mgKOH/g to 40 mgKOH/g lower than that of polyurethane resin A contained in the black pigment ink. When acid values of polyurethane resin A in the black pigment and polyurethane resin A in the color pigment ink are made to differ in this way, a mixture of the black pigment and the color pigment ink may become unstable, and the mixture tends to form an aggregate, thereby making it possible to prevent color-spreading. When the difference of the acid values of the polyurethane resins is outside of the above-mentioned range, however, the problem of color-spreading cannot be solved (see Comparative Examples 3, 5, and 6 mentioned herein below). Furthermore, even in cases in which color-spreading is preventable, other properties, such as storage stability may be degraded (see Comparative Example 4 mentioned later)

<<Polyurethane Resin>>

The polyurethane resin is a polymer which is composed of a diisocyanate compound and a diol compound and has a polyurethane backbone having a main chain composed of monomers linked with urethane bonding. The polyurethane resin used in the present invention is preferably a water-dispersible polyurethane resin, which is generally a water dispersion of polyurethane resin obtained by either introducing a hydrophilic component into a main chain of the polyurethane backbone for stabilizing the dispersion thereof in water and dispersing the hydrophilic compound-introduced polyurethane resin, or, by use of an external emulsifier for stabilizing the dispersion. The polyurethane resin is particularly preferably a self-dispersible (self-emulsifying) type water-dispersible polyurethane resin having a hydrophilic component introduced in the main chain.

Examples of such a self-emulsifying polyurethane resin include various water-dispersible polyurethane resins (such as ester polyurethane resin, ether polyurethane resin, and carbonate polyurethane resin) obtained by reacting a diisocyanate compound with a diol compound (such as polyether diol, polyester diol, polycarbonate diol, and the like) and an acid-group-containing diol (such as a diol containing an acid group as such as a carboxylic acid group, a sulfonic acid group, and the like). In the present invention, chiefly the ether polyurethane resin A is used for such a self-emulsifying polyurethane resin.

When carbon black used in the black pigment ink is dispersed with the polyurethane resin A, dispersion is much more stable than dispersion with carbon black alone. Although its precise mechanism is unknown, the dispersion with carbon black and polyurethane resin A may be stable, as mentioned above, because the polyurethane resin A encapsulates carbon black particles, serving as a protective colloid.

—Diisocyanate Compound—

Examples of the diisocyanate compound include aliphatic diisocyanate compounds such as hexamethylene diisocyanate and 2,2,4-trimethylhexamethylene diisocyanate; alicyclic diisocyanate compounds such as isophorone diisocyanate, hydrogenated xylylene diisocyanate, 1,4-cyclohexane diisocyanate, and 4,4'-dicyclohexylmethane diisocyanate; aroma-aliphatic diisocyanate compounds such as xylylene diisocyanate and tetramethylxylylene diisocyanate; aromatic diisocyanate compounds such as toluylene diisocyanate and phenylmethane diisocyanate; and modified products of these diisocyanates (such as carbodiimide-modified, urethdione-modified, and urethimine-modified diisocyanates).

—Diol Compound—

Examples of the diol compound include polyether diols such as polyethylene glycol, polypropylene glycol, polytetramethylene ether glycol, and polyhexamethylene ether glycol; polyester diols such as poly(ethylene adipate), poly(butylene adipate), poly(neopentyl adipate), poly(3-methylpentyl adipate), poly(ethylene/butylene adipate), and poly(neopentyl/hexyl adipate); a polylactone diol such as polycaprolactone diol; and polycarbonate diols. From the viewpoint of ink storage stability, the diol compound is preferably a polyether diol compound, a polyester diol compound, or a polycarbonate diol compound, more preferably a polyether diol compound or a polycarbonate diol compound, and particularly preferably a polyether diol compound. The polyether diol compound and the polycarbonate diol compound are somewhat resistant to denaturation caused by hydrolysis occurring in water, and thereby have excellent storage stability.

Examples of the acid-group containing diol include dimethylol acetic acid, dimethylol propionic acid, dimethylol butanoic acid, and dimethylol butyric acid. In particular, dimethylol butanoic acid is preferable.

—Method for Synthesizing Polyurethane Resin—

A method for synthesizing a polyurethane resin is not particularly limited, and is, for example, a known method such as a method using a solution, a method using a prepolymer, or a hot-melting method. When a prepolymer method using a low-molecular weight polyhydric compound is employed, the low-molecular weight polyhydric compound is, for example, a diol compound as mentioned above for a component of polyurethane and its adduct with a small molar amount of alkylene oxide, and a triol compound, such as glycerin, trimethylolethane, or trimethylolpropane, and its adduct with a small molar amount of alkylene oxide.

For a method of producing an aqueous polyurethane resin, a method of subjecting a polyurethane prepolymer (prepared in an organic solvent phase) to phase inversion, emulsifying the polyurethane prepolymer, and further extending chains of the polyurethane in a water phase, is generally known. For a chain extender in this case, a polyamine such as diamine is generally used. Specifically, after acid groups derived from dimethylol alkanoic acids have been neutralized, the polyurethane prepolymer is extended with water, the diamine, or a triamine while it is neutralized. Examples of the polyamine used for the chain extender in chain extension with an amine generally include a diamine or a triamine such as hexamethylenediamine, isophoronediamine, hydrazine, and piperazine. When a polyurethane resin prepared with a polyamine serving as a chain extender is used in a recording liquid, the storage stability of the recording liquid, however, tends to be degraded. The fact that the polyurethane resin which is extended with an amine (a polyurethane resin containing a polyurethane urea part) tends to hydrolyze, and the fact that a polyamine produced by the hydrolysis thereof serves as a flocculant in a pigment dispersion recording liquid, are likely to synergistically cause degradation of the storage stability of the recording liquid.

The polyurethane resin may be used as a salt of an alkaline metal such as Li, Na, and K, as an ammonium salt, or as a salt of an organic amine such as dimethylamine, and mono-, di-, and triethanolamine. These salts may be prepared by neutralizing the polyurethane resin obtained according to the above-mentioned methods. The base used for neutralizing the polyurethane resin may be appropriately selected depending on the type of salt counter ion desired, and may be, for example, an alkylamine such as butylamine and triethylamine; an alkanolamine such as monoethanolamine, diethanolamine, and triethanolamine; morpholine; ammonia; and an inorganic base such as sodium hydroxide.

<<Dispersing Agent>>

—Dispersing Agent Used in Black Pigment Ink—

A dispersing agent used in the black pigment ink of the present invention may be appropriately selected depending on the type of a carbon black used, and may be, for example, an anionic surfactant such as a surfactant selected from the group consisting of alkyl sulfonate, alkyl benzene sulfonate, alkyl naphthalene sulfonate (a sodium naphthalene sulfonate formaldehyde condensate), alkanesulfonate or olefin sulfonate, alkyl sulfate, polyoxyethylene alkyl sulfate or alkyl aryl ether sulfate, alkyl phosphate, alkyl diphenyl ether disulfonate, ether carboxylate, alkyl sulfosuccinate, α-sulfo fatty acid ester, fatty acid salt (a condensate of a higher fatty acid and an amino acid), and naphthenic acid; and, a nonionic surfactant such as a polyoxyethylene alkyl ether, for example, polyoxyethylene lauryl ether, polyoxyethylene myristyl ether, polyoxyethylene cetyl ether, polyoxyethylene stearyl ether, and polyoxyethylene oleyl ether; a polyoxyethylene alkylphenyl ether such as, for example, polyoxyethylene octylphenyl ether, and polyoxyethylene nonylphenyl ether; and, polyoxyethylene-α-naphthyl ether, polyoxyethylene-β-naphthyl ether, polyoxyethylene monostyrylphenyl ether, polyoxyethylene distyrylphenyl ether, polyoxyethylene alkylnaphthyl ether, polyoxyethylene monostyryl naphthyl ether, polyoxyethylene distyryl naphthyl ether, and block copolymer of polyoxyethylene and polyoxypropylene.

—Anionic surfactant—

From the view point of dispersibility in a liquid that contains a carbon black and from the view point of prevention of ink foaming, an aromatic sulfonate such as a sodium naphthalene sulfonate formaldehyde condensate is preferably used among the above-mentioned anionic surfactants. The aromatic sulfonate is produced by introducing a sulfonic acid group into an aromatic compound and neutralizing the thus produced aromatic sulfonic acid with a basic compound. Examples of the aromatic sulfonic acid include benzene sulfonic acid, p-toluene sulfonic acid, naphthalene sulfonic acid, and alkylnaphthalene sulfonic acid. Examples of the basic compound include alkylamines such as butylamine, triethylamine; alkanolamines such as monoethanolamine, diethanolamine, triethanolamine, and triisopropanolamine; morpholine; aqueous ammonia; sodium hydroxide, lithium hydroxide, and potassium hydroxide; aminomethyl propanediol, aminoethyl propanediol, and choline. Alternatively, the basic compound may be a basic compound other than those listed above such as a buffering agent, for example, tris(hydroxymethyl)-aminomethane and good buffer. In addition, a product produced by a condensation reaction of an aromatic sulfonate with formaldehyde and the like may be used. The sodium naphthalene sulfonate formaldehyde condensate is not particularly limited, as long as it is a condensate of sodium naphthalene sulfonate and formaldehyde and is a product having the above-mentioned condensate as a repeating unit.

—Dispersing Agent Used in Color Pigment Ink—

A dispersing agent used in the color pigment ink of the present invention is not particularly limited, however, preferably is a compound represented by the following General Formula (1), which can produce an aqueous pigment ink having particles with small average particle diameters and with small standard deviations thereof shown in their particle size distributions:

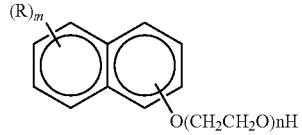

General Formula (1)

wherein R represents one of an alkyl group having 1 to 20 carbon atoms, an aryl group, and an aralkyl group; m represents an integer from 0 to 7; and n represents an integer from 20 to 100.

In the above General Formula (1), n is preferably an integer from 30 to 50. When n is 20 or more, degradation of the dispersion stability of an ink can be prevented, and excessive increase in the average particle diameters of pigment particles in an ink and in the standard deviations thereof in particle size distributions thereof can be prevented, resulting in achievement of adequate color saturation of an image. When n is 100 or less, excessive increase in the viscosity of the ink can be prevented, and printing according to an inkjet method can be performed without difficulty. Particularly preferably, polyoxyethylene (n=40)-β-naphthyl ether is used for the dispersing agent represented by the General Formula (1).

<<Dispersing Solvent>>

The dispersing solvent is not particularly limited, and may be appropriately selected depending on the intended purpose, and may be, for example, distilled water, glycerin, diethylene glycol, 2-ethyl-1,3-hexanediol, or 2-pyrrolidone.

<<Additional Component>>

In the ink set of the present invention, the total amount of sulfate ion, chlorine ion, or nitrate ion contained in a black pigment ink is preferably 50 ppm to 500 ppm, and more preferably 150 ppm to 400 ppm. Furthermore, the total amount of calcium ion contained in a color pigment ink is preferably 50 ppm to 500 ppm, and more preferably 150 ppm to 400 ppm. When the total amount of each ions is within the above-mentioned range, pigment particles do not aggregate with one another, and therefore improvement in the dispersion stability and production of images having much higher quality can be expected.

When a large amount of residual ions are contained in the carbon black and the dispersing agent, the carbon black and the dispersing agent are preferably desalted, and neutralized. A simple method for desalting and neutralizing may be a method of passing the pigment dispersion through a column charged with a cation exchange resin or an anion exchange resin. The unwanted cations and anions in a pigment dispersion can be removed by such a method as mentioned above. In addition to the above-mentioned methods, a method of using a compound such as calcium chloride, calcium bromide, calcium iodide, calcium nitrite, calcium nitrate, calcium dihydrogenphosphate, calcium thiocyanate, calcium lactate, calcium benzoate, calcium acetate, calcium salicylate, calcium tartrate, calcium fumarate, or calcium citrate, may be used.

It is generally known that a black pigment ink containing a polyurethane resin in combination with a carbon black having a large volume of volatile component can cause some problems in ejection stability, image density, and ink storage stability. However, in the present invention even carbon black having about 8.0% to 12.0% volatile component can be used without a problem, possibly because of a high acid value, that is, 65 mgKOH/g to 85 mgKOH/g, of polyurethane resin A used in the present invention (a conventionally used polyurethane resin has an acid value of about 50 mgKOH/g).

It is not known exactly why the print image density of inkjet recoded matter is higher when a carbon black having a volatile component in an amount of 8.0% or more is used. However, the reason may be that such a carbon black, the surface of which many acid groups are formed on, has, in itself, a high compatibility with ink solvent, making it microdispersible and thereby increasing the image density of the inkjet recorded matter. However, when a carbon black contains a volatile component in an amount of more than 12.0% and an ink containing the carbon black is ejected by means of an inkjet recording apparatus, the failure rate of printing tends to be high. The failure rate of printing tends to be high, possibly because an excessively large amount of volatile component in the ink causes considerable deposition of the ink on a head.

Note that the amount of volatile component in a carbon black referred to herein, is an amount quantified in accordance with the following quantification method. That is a method, where a dry sample of a carbon black is placed in a platinum crucible with a lid, or, in a porcelain crucible which has the same shape and the same volume as the platinum crucible and has a lid (drop lid), to a level of 2 mm or more below the lid by tapping the crucible on a substrate the crucible while shaking it, after which the weight ($W_D$) of the sample is weighed. Next, the crucible is closed with a lid, placed in an electric furnace, and heated at 950° C.±25° C. for precisely 7 min, then, the crucible is taken out from the electric furnace, and allowed to cool to a room temperature alone in a desiccator, and then the weight of the sample ($W_R$) after heating is weighed. The amount of volatile component (V) is calculated by assigning the values of $W_D$ and $W_R$, to the following equation:

$$V = \frac{W_D - W_R}{W_D} \times 100 \quad \text{Equation (1)}$$

where, V represents the amount of volatile component (%), $W_D$ represents the weight of the dry sample (g), and $W_R$, represents the weight of the sample after heating.

The physical properties of the pigment ink of the inkjet recording ink set of the present invention are not particularly limited, and may be appropriately selected depending on the intended purpose.

After preparation of the pigment ink of the inkjet recording ink set of the present invention, the pigment ink is preferably subjected to filtration under reduced pressure or pressure using a metal filter, a membrane filter, or the like, or to centrifugal filtration with a centrifugal separator, so as to remove coarse particles, foreign matter (dust or dirt), and the like therefrom.

(Cartridge and Inkjet Recording Apparatus)

An ink cartridge containing the pigment ink of the inkjet recording ink set of the present invention can be constructed and housed in an inkjet recording apparatus, and thereby the pigment ink can be ejected from orifices, in accordance with recording signals, to a recording material to form an image on the recording material and thereby attain a printed image.

Examples of a method for printing with the pigment ink of the present invention include a method for printing by means of an inkjet printer having a continuous ejection type recoding head or an on-demand type recording head. Examples of the on-demand type recording head include those using a piezo method, a thermal inkjet method, and an electrostatic method. For methods for constructing an ink cartridge and an inkjet recording apparatus, and for forming an image, methods known in the art, such as those disclosed in JP-A No. 2000-198958, may be suitably employed.

FIG. 1 shows an embodiment of the inkjet recording apparatus of the present invention. This inkjet recording apparatus (printer) ejects, for example, four inks each having different color (black, yellow, cyan, and magenta) onto a recording medium such as printing paper so as to form images thereon.

The inkjet printer 1 is equipped with four inkjet heads 11 which eject inks having respective colors, a carriage 12 on which the four inkjet heads 11 are mounted, a guide rod 13 along which the carriage 12 is moved in a main scanning direction (a horizontal direction in FIG. 1) by a driving system (not shown), and a paper conveying mechanism 14 which conveys printing paper P in a secondary scanning direction (a vertical direction in FIG. 1). The paper conveying mechanism 14 is equipped with a conveying roller 15 which is rotated by the driving system (not shown), a tension roller 16, and a conveying belt 17 which is stretched between the two rollers.

Each of the inkjet heads 11 is equipped with a piezo actuator composed of a piezoelectric element. Naturally, each of the inkjet heads 11 may be equipped with another type of actuator configured to eject inks, such as a thermal actuator, a shape-memory alloy actuator, or an electrostatic actuator.

Furthermore, the inkjet printer 1 is equipped with four ink cartridges 18 containing the inks having respective colors, four subtanks 19 which are mounted on the carriage 12 and continue to the respective inkjet heads 11, and an ink supply tube (not shown) with which the ink cartridges 18 are communicated to the respective subtanks 19, so that the inks of respective colors which are contained in the respective ink cartridges 18 are supplied to the respective inkjet heads 11 via the respective subtanks 19. That is, a liquid flow channel of the inkjet printer 1 is composed of an ink supply tube, subtanks 19, and a flow channel in the heads of the inkjet heads 11. Note that the ink supply tube is further equipped with a supply pump (not shown) configured to supply the subtanks 19 with the inks in the ink cartridges 18.

When a cleaning liquid is injected into the liquid flow channel for cleaning the liquid flow channel, a cartridge containing a cleaning liquid according to the present invention may be set instead of the ink cartridge 18.

<Recording Medium>

The recording medium, to which the present invention is applicable, may be a recording medium having ink-composition absorbency, or a recording medium substantially lacking ink-composition absorbency. Specific examples thereof include plastic sheets based on a material such as polyethylene terephthalate, polycarbonate, polypropylene, polyethylene, polysulfone, ABS resins, or polyvinyl chloride; recording media manufactured by coating with a metal a surface of a metal such as brass, iron, aluminum, SUS, or copper, or by coating with a metal a nonmetal base material, using a technique such as vapor deposition; recording media manufactured by subjecting paper as a base material to water-shedding treatment; and recording media composed of a so-called ceramic material manufactured by firing an inorganic material at a high temperature. Among these, paper is particularly preferred in terms of economic efficiency and naturalness of images produced thereon.

EXAMPLES

Hereinafter, the present invention will be described in more detail with reference to Examples, which, however, should not be construed as limiting the scope of the present invention. Note that "part(s)" in Examples represents "part(s) by mass".

Examples 1 to 7, and Comparative Examples 1 to 6

Preparation of Pigment Dispersion

The materials in each of the following formulations were premixed to prepare a slurry mixture.

Next, the slurry mixture was dispersed, while circulating the slurry, by means of a disc-type Media Mill (UAM type, manufactured by KOTOBUKI INDUSTRIES CO., LTD.; size of zirconia beads: 0.015 mm; filling rate: 70%; peripheral speed: 6 m/s; and liquid temperature: 10° C.) to a dispersion of particles having a predetermined average particle diameter.

Subsequently, into a beaker, 100 g of the dispersion thus obtained was placed, and then, further, 20 g of cation/anion exchange resins were placed, and coarse particles were separated from the mix by means of a centrifugal separator (Model-7700, manufactured by KUBOTA Corporation), the mix was, then, filtered with a filter having a 1.2 μm pore diameter, to obtain a black pigment dispersion and a color pigment dispersion.

[Formulation of Black Pigment Dispersion]

| | |
|---|---|
| Black pigment (pigment black 7: NIPEX150, manufactured by Degussa Japan) | 250 parts |
| Dispersing agent (sodium naphthalene sulfonate formaldehyde condensate: A-45-PN, manufactured by TAKEMOTO OIL & FAT Co., Ltd, see the following General Formula (2)) | 50 parts |
| Distilled water | 700 parts |

General Formula (2)

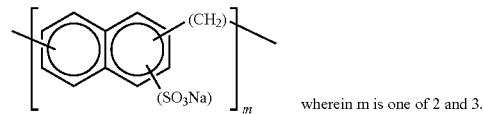

wherein m is one of 2 and 3.

[Formulation of Color Pigment Dispersion]

| | |
|---|---|
| Yellow pigment (Pigment yellow 74: Yellow No. 43, manufactured by Dainichiseika Color & Chemicals Mfg. Co., Ltd) | 200 parts |
| Dispersing agent [a sample of the compound represented by the General Formula (1) where m = 0 and n = 40] | 100 parts |
| Distilled water | 700 parts |

A pigment ink was prepared according to the following formulation, and the mix was stirred for 30 min, filtered with a membrane filter having a pore diameter of 0.8 μm, and the filtrate was vacuum-degassed to prepare each of ink sets of Examples 1 to 7 and Comparative Examples 1 to 6. Polyurethane resin A used in each of these ink sets is shown in Table 2-1. Note that the type of polyurethane resin A used in each of Examples and Comparative Examples is shown in Table 1.

[Ink Formulation]

| | |
|---|---|
| Pigment dispersion (when the concentration of the pigment is 25% by mass, the total solid content is 8% by mass) | 39.0 parts |
| Glycerin | 7.5 parts |
| Diethylene glycol | 15.0 parts |
| 2-Ethyl-1,3-hexane diol | 3.0 parts |
| 2-Pyrrolidone | 3.0 parts |
| Sodium polyoxyethylene (3) alkyl (C13) ether acetate | 0.5 parts |
| Polyurethane resin A (see Table 1) | 2.0 parts |
| Distilled water | 30.0 parts |

(Note that sodium polyoxyethylene (3) alkyl (C13) ether acetate is used as a penetrant (surfactant) in the above ink formulation for enhancing stretch of the ink on a surface after the ink lands on the surface.)

Examples 8 and 9

An ink set of Example 8 was prepared in the same manner as in Example 1, except that the dispersing agent used in the Formulation of color pigment dispersion of the Example was changed to a sample of the compound represented by the General Formula (1) where m=0 and n=20.

Similarly, an ink set of Example 9 was prepared in the same manner as in Example 1, except that the dispersing agent was changed to a sample of the compound represented by the General Formula (1) where m=0 and n=100.

These are indicated in Table 2-1.

Examples 10 and 11

An ink set of Example 10 (a black pigment ink and a magenta pigment ink) was prepared in the same manner as in Example 2, except that pigment red 122 (CROMOPHTAL JET Magenta DMQ, manufactured by Ciba Specialty Chemicals) was used instead of pigment yellow 74 which has been used in the above-mentioned Formulation of color pigment dispersion.

Similarly, an ink set of Example 11 (a black pigment ink and a cyan pigment ink) was prepared in the same manner as in Example 2, except that pigment blue 15:3 (Cyanine Blue-A-385, manufactured by Dainichiseika Color & Chemicals Mfg. Co., Ltd.) was used instead of pigment yellow 74 which has been used in the above-mentioned Formulation of color pigment dispersion.

Examples 12 to 14

An ink set of Example 12 was prepared in the same manner as in Example 1, except that the dispersing agent used in the Formulation of color pigment dispersion of the Example was changed to a sample of the compound of General Formula (1) where m=0 and n=10, which sample was manufactured by TAKEMOTO OIL & FAT Co., LTD.

Similarly, an ink set of Example 13 was prepared in the same manner as in Example 1, except that the dispersing agent was changed to a sample of the compound of General Formula (1) where m=0 and n=210, which sample was manufactured by TAKEMOTO OIL & FAT Co., LTD.

Furthermore, an ink set of Example 14 was prepared in the same manner as in Example 1, except that the dispersing agent used in the Formulation of black pigment dispersion of the Example was changed to a water-soluble styrene-acrylate resin (HPD-96, manufactured by BASF Japan Ltd.).

TABLE 1

| Urethane resin | Type (trade name, manufacturer) | Ionic structure | Acid value (mgKOH/g) |
|---|---|---|---|
| Resin a | Urethane resin (XW-75-W932, Mitsui Chemical Polyurethane, Inc) | Anionic self-emulsifying ether | 80 |

TABLE 1-continued

| Urethane resin | Type (trade name, manufacturer) | Ionic structure | Acid value (mgKOH/g) |
|---|---|---|---|
| Resin b | Urethane resin (W5661, Mitsui Chemical Polyurethane, Inc) | Anionic self-emulsifying ether | 48 |
| Resin c | Urethane resin (sample 1) | Anionic self-emulsifying ether | 65 |
| Resin d | Urethane resin (sample 2) | Anionic self-emulsifying ether | 85 |
| Resin e | Urethane resin (sample 3) | Anionic self-emulsifying ether | 64 |
| Resin f | Urethane resin (sample 4) | Anionic self-emulsifying ether | 86 |
| Resin h | Urethane resin (sample 5) | Anionic self-emulsifying ether | 55 |
| Resin i | Urethane resin (sample 6) | Anionic self-emulsifying ether | 25 |
| Resin j | Urethane resin (sample 7) | Anionic self-emulsifying ether | 75 |
| Resin k | Urethane resin (sample 8) | Anionic self-emulsifying ether | 45 |
| Resin l | Urethane resin (sample 9) | Anionic self-emulsifying ether | 56 |
| Resin m | Urethane resin (sample 10) | Anionic self-emulsifying ether | 24 |
| Resin n | Urethane resin (sample 11) | Anionic self-emulsifying ether | 76 |
| Resin o | Urethane resin (sample 12) | Anionic self-emulsifying ether | 44 |

Note that polyurethane resins c to o in the above Table 1 were synthesized by reacting a polyol, which is chiefly a glycol, with a diisocyanate (OCN—R—NCO), which is chiefly a difunctional isocyanate, and the acid value of each of the polyurethane resins was adjusted by varying the mixing ratio of the polyol and the diisocyanate for each polyurethane. Further, other functional group(s), such as a carboxylic group and an amino group, may be used in combination with the hydroxyl group and the isocyanate group in monomers of the polyurethane resins, and thereby it is possible to produce products having a wide variety of properties. The acid values of the polyurethane resins may be controlled by adjusting the amount of these functional groups (i.e., the carboxylic group, the amino group, and the like) incorporated in the polyurethane resins; for example, the acid values thereof can be increased by increasing the amount of the carboxyl groups.

Note that the acid value was measured according to JIS K2501.

An ink pack for an inkjet printer (IPSIO GX 5000, manufactured by Ricoh Company, Ltd.) was charged with each of ink sets including a black pigment ink and color pigment ink(s) of the Examples and Comparative Examples to construct an ink cartridge.

An image was printed on a sheet of PPC paper (XEROX4200, manufactured by Fuji Xerox Co., Ltd.) by means of an inkjet printer, manufactured by Ricoh Company, Ltd., which has been equipped with the ink cartridge. Then, the density of the printed image, the color-spreading, the storage stability, and the ejection stability were evaluated as follows. The results of the evaluation are shown in Tables 2-1 and 2-2.

(Evaluation 1: Color-Spreading (Color-Spreading Over the Boundary Between a Black Area and a Yellow Area))

A pattern, in which areas of differing colors border one another, was printed. The degree to which colors spread over the boundary was evaluated by an organoleptic test comparing color-spreading produced by the inks of the present invention with a predetermined limit sample of color-spreading.
A: little color-spreading recognized
B: some color-spreading recognized, however, allowable
C: color-spreading severe, and out of an allowable range (Evaluation 2: Image Density)

The density of solid images of image samples was measured with an X-Rite densitometer. Evaluation criteria thereof are as follows.
(—Density of Black Solid Image—)
A: 1.30 or higher
B: 1.20 or higher, to lower than 1.30.
C: lower than 1.20.
(—Density of Color Solid Image Having Y Color—)
A: 0.80 or higher
B: 0.70 or higher, to lower than 0.80
C: lower than 0.70
(—Density of Color Solid Image Having M Color—)
A: 1.10 or higher
B: 1.00 or higher to lower than 1.10
C: lower than 1.00
(—Density of Color Solid Image Having C Color—)
A: 1.20 or higher
B: 1.10 or higher to lower than 1.20
C: lower than 1.10

(Evaluation 3: Ejection Stability)

A printer was placed in a thermostatic chamber having a temperature of 32° C. and a RH of 30% within the chamber. Then, a print pattern chart, which will be described later, was continuously printed on 20 sheets with the printer, after which the operation of the printer was interrupted for 20 min. When this combination of an operational period of the printer for printing 20-charts and a non-operational period of 20 min was repeated for 50 times, and when the cumulative total of the printed chart sheets reached 1,000 chart sheets, nozzle plates of the printer were observed under a microscope, and judgment was made as to whether or not the ink was fixed on the nozzle plate.

The print pattern chart, which had a 5% print area within the image area in the chart, was printed using each of the inks by means of the printer operating at 100% of its duty cycle. The conditions for printing were; recording density: 300 dpi; printing operation: single-pass.

The evaluation criteria are as follows:
A: no ink fixation found in proximity to the nozzles
B: slight fixation found in proximity to the nozzles
C: some fixation found in proximity to the nozzles (Evaluation 4: Storage Stability)

Each of the inks was placed in a polyethylene container, which was then sealed, and each of the inks was stored for 3 weeks at 70° C. Then, the particle diameter, the surface tension, the viscosity of the thus-stored ink was measured, and evaluated based on the calculation of a rate of change in these physical properties from the initial state of the ink to the ink after storage. The evaluation criteria were as follows.
A: rate of change is within the range of 10% of the initial values.
B: rate of change is within the range of 30% of the initial values.

C: rate of change is outside the range of 30% of the initial values

TABLE 2-1

| | Polyurethane resin of black pigment ink (Bk) | | Polyurethane resin of color pigment ink(s) (Cl) | | Difference in acid value | Color spreading |
|---|---|---|---|---|---|---|
| | Type | Acid value | Type | Acid value | | |
| Ex. 1 | a | 80 | b | 48 | 32 | A |
| Ex. 2 | c | 65 | b | 48 | 17 | A |
| Ex. 3 | d | 85 | b | 48 | 37 | A |
| Ex. 4 | c | 65 | h | 55 | 10 | A |
| Ex. 5 | c | 65 | i | 25 | 40 | A |
| Ex. 6 | d | 85 | j | 75 | 10 | A |
| Ex. 7 | d | 85 | k | 45 | 40 | A |
| Ex. 8 | a | 80 | b | 48 | 32 | A |
| Ex. 9 | a | 80 | b | 48 | 32 | A |
| Ex. 10 | c | 65 | b | 48 | 17 | A |
| Ex. 11 | c | 65 | b | 48 | 17 | A |
| Ex. 12 | a | 80 | b | 48 | 32 | B |
| Ex. 13 | a | 80 | b | 48 | 32 | B |
| Ex. 14 | a | 80 | b | 48 | 32 | B |
| Comp. Ex. 1 | e | 64 | b | 48 | 16 | C |
| Comp. Ex. 2 | f | 86 | b | 48 | 38 | B |
| Comp. Ex. 3 | c | 65 | l | 56 | 9 | C |
| Comp. Ex. 4 | c | 65 | m | 24 | 41 | A |
| Comp. Ex. 5 | d | 85 | n | 76 | 9 | B |
| Comp. Ex. 6 | d | 85 | o | 44 | 41 | C |

TABLE 2-2

| | Storage stability | | Ejection stability | | Image density | |
|---|---|---|---|---|---|---|
| | Bk | Cl | Bk | Cl | Bk | Cl |
| Ex. 1 | A | A | A | A | A | A |
| Ex. 2 | A | A | A | A | A | A |
| Ex. 3 | A | A | A | A | A | A |
| Ex. 4 | A | A | A | A | A | A |
| Ex. 5 | A | A | A | A | A | A |
| Ex. 6 | A | A | A | A | A | A |
| Ex. 7 | A | A | A | A | A | A |
| Ex. 8 | A | A | A | A | A | A |
| Ex. 9 | A | A | A | A | A | A |
| Ex. 10 | A | A | A | A | A | A |
| Ex. 11 | A | A | A | A | A | A |
| Ex. 12 | A | B | A | B | A | B |
| Ex. 13 | A | A | A | B | A | B |
| Ex. 14 | B | A | B | A | B | A |
| Comp. Ex. 1 | B | A | B | A | B | A |
| Comp. Ex. 2 | C | A | C | A | B | A |
| Comp. Ex. 3 | A | A | A | A | A | A |
| Comp. Ex. 4 | A | C | A | C | A | A |
| Comp. Ex. 5 | A | C | A | C | A | C |
| Comp. Ex. 6 | A | A | A | A | A | A |

REFERENCE SIGNS LIST

1 Inkjet printer
11 Inkjet head
12 Carriage equipped with inkjet head 11
13 Guide rod
14 Paper conveying mechanism
15 Conveying roller
16 Tension roller
17 Conveying belt
18 Ink cartridge
19 Subtank
P Printing paper

The invention claimed is:

1. An inkjet recording ink set, comprising:
a black pigment ink; and
at least one color pigment ink comprising one or more colors,
wherein the black pigment ink comprises a first anionic self-emulsifying ether polyurethane resin having an acid value of 65 mgKOH/g to 85 mgKOH/g, and each color pigment ink comprises a second anionic self-emulsifying ether polyurethane resin having an acid value which is 10 mgKOH/g to 40 mgKOH/g lower than the acid value of the first anionic self-emulsifying ether polyurethane resin comprised in the black pigment ink wherein the black pigment ink further comprises carbon black and the carbon black has a volatile component of 8.0% to 12.0%.

2. The ink set of claim 1, wherein the black pigment ink comprises a sodium naphthalene sulfonate formaldehyde condensate, and each color pigment ink comprises a compound of formula (1):

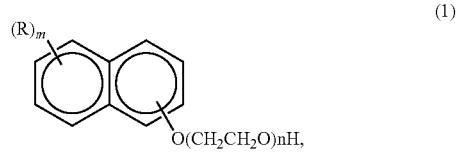

(1)

wherein
R is an alkyl group comprising 1 to 20 carbon atoms, an aryl group, or an aralkyl group,
m is an integer from 0 to 7, and
n is integer from 20 to 100.

3. The ink set of claim 1, wherein R is an alkyl group comprising 1 to 20 carbon atoms in formula (1).

4. The ink set of claim 1, wherein R is an aryl group in formula (1).

5. The ink set of claim 1, wherein R is an aralkyl group in formula (1).

6. The ink set of claim 1, wherein n is an integer from 30 to 50 in formula (1).

7. The ink set of claim 1, wherein the compound of formula (1) is polyoxyethylene (n=40)-β-naphthyl ether.

8. An ink cartridge, comprising:
a black pigment ink; and
at least one color pigment ink comprising one or more colors,
wherein the black pigment ink and each color pigment ink are comprised in an inkjet recording ink set, and
wherein the black pigment ink comprises a first anionic self-emulsifying ether polyurethane resin having an acid value of 65 mgKOH/g to 85 mgKOH/g, and each color pigment ink comprises a second anionic self-emulsifying ether polyurethane resin having an acid value which is 10 mgKOH/g to 40 mgKOH/g lower than the acid value of the first anionic self-emulsifying ether polyurethane resin comprised in the black pigment ink.

9. The ink cartridge of claim 8, wherein the black pigment ink further comprises carbon black and the carbon black has a volatile component of 8.0% to 12.0%.

10. An inkjet recording apparatus, comprising a head configured to record an image on a medium by ejecting a black pigment ink and at least one color pigment ink comprising one or more colors,
   wherein the black pigment ink and each color pigment ink are comprised an inkjet recording ink set, and
   wherein the black pigment ink comprises a first anionic self-emulsifying ether polyurethane resin having an acid value of 65 mgKOH/g to 85 mgKOH/g, and each color pigment ink comprises a second anionic self-emulsifying ether polyurethane resin having an acid value which is 10 mgKOH/g to 40 mgKOH/g lower than the acid value of the first anionic self-emulsifying ether polyurethane resin comprised in the black pigment ink.

11. The inkjet recording apparatus of claim 10, wherein the black pigment ink further comprises carbon black and the carbon black has a volatile component of 8.0% to 12.0%.

* * * * *